US012358255B2

(12) United States Patent
Wakabayashi et al.

(10) Patent No.: US 12,358,255 B2
(45) Date of Patent: Jul. 15, 2025

(54) METHOD FOR MANUFACTURING MOLDED BODY

(71) Applicant: SEIKO EPSON CORPORATION, Tokyo (JP)

(72) Inventors: Shigemi Wakabayashi, Nagano (JP); Masahiko Nakazawa, Nagano (JP); Yasuo Miyamoto, Nagano (JP); Takumi Sago, Nagano (JP); Takashi Shinohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 276 days.

(21) Appl. No.: 18/341,794

(22) Filed: Jun. 27, 2023

(65) Prior Publication Data

US 2024/0001641 A1 Jan. 4, 2024

(30) Foreign Application Priority Data

Jun. 29, 2022 (JP) ................................. 2022-104322

(51) Int. Cl.
*B31F 1/00* (2006.01)

(52) U.S. Cl.
CPC .................................. *B31F 1/0077* (2013.01)

(58) Field of Classification Search
None
See application file for complete search history.

(56) References Cited

U.S. PATENT DOCUMENTS 6,537,474 B1 * 3/2003 Kim ......................... B27N 3/08 264/123
6,878,199 B2 * 4/2005 Bowden .................. C08L 97/02 264/300

(Continued)

FOREIGN PATENT DOCUMENTS

JP H05-246465 A 9/1993

OTHER PUBLICATIONS

Balet, Rapid Visco Analyser (RVA) as a Tool for Measuring Starch-Related Physiochemical Properties in Cereals: a Review, 2019 , Springer Science+Business Media (Year: 2019).*

*Primary Examiner* — Farah Taufiq
(74) *Attorney, Agent, or Firm* — Global IP Counselors, LLP

(57) ABSTRACT

A method for manufacturing a molded body, includes a deposition step of depositing a mixture containing fibers and a starch in air; a moisturizing step of applying water to the mixture; and a molding step of forming a molded body by heating and pressurizing the mixture to which the water is applied, and the starch has a value of 2,000 to 10,000, the value being represented by the following expression (I) and being obtained by measurement performed in accordance with the following measurement methods (1) to (4) using a rapid visco analyzer (RVA).

$$5{,}000-30\times T_1-90\times(T_2-T_1)+2\times\eta_1-15\times\eta_2 \qquad \text{(I)}$$

In the expression (I), $T_1$ represents a gelatinization start temperature (° C.), $T_2$ represents a gelatinization peak temperature (° C.), $\eta_1$ represents a gelatinization peak viscosity (mPa·s), and $\eta_2$ represents a trough viscosity (mPa·s), and the measurement is performed such that (1) after a water suspension containing the starch at 25 percent by mass is charged in the RVA as a measurement sample, the temperature thereof is increased to 50° C. and then maintained for one minute; (2) the temperature of the measurement sample is increased from 50° C. to 93° C. over 4 minutes and then maintained at 93° C. for 7 minutes; (3) the temperature of the measurement sample is decreased from 93° C. to 50° C. over 4 minutes and then maintained at 50° C. for 3 minutes; and (4) in the above (2) and (3), a rotational speed of a measurement paddle of the RVA is set to 960 rpm for 10 seconds after the start of the viscosity measurement and is then set to 160 rpm 10 seconds thereafter.

7 Claims, 2 Drawing Sheets

(56) References Cited

U.S. PATENT DOCUMENTS

| | | | | |
|---|---|---|---|---|
| 2005/0025867 | A1* | 2/2005 | Ames | A23L 7/183 426/465 |
| 2021/0363700 | A1* | 11/2021 | Yoshioka | D04H 1/425 |

* cited by examiner

METHOD FOR MANUFACTURING MOLDED BODY

The present application is based on, and claims priority from JP Application Serial Number 2022-104322, filed Jun. 29, 2022, the disclosure of which is hereby incorporated by reference herein in its entirety.

BACKGROUND

1. Technical Field

The present disclosure relates to a method for manufacturing a molded body.

2. Related Art

To obtain a molded body in such a manner that after a fibrous material is deposited, a binding force is applied between fibers thus deposited has been performed since a long time ago. For example, as a method for manufacturing a molded body, such as paper, a paper plate, or a paper quality board, containing cellulose fibers, a so-called dry method, that is, a method in which water is not at all used or hardly used, has been anticipated. In general, when a paper product is formed, a large amount of water is used, and hence, for example, in order to reduce the water usage, developments have been carried out.

For example, JP-A-5-246465 has disclosed a method for manufacturing a buffer material or the like performed in such a manner that after moisture in the form of mist is applied to defibrated and fluffy used paper, a powdery or a granular adhesive paste is added thereto, and a mixture thus formed is then molded and dried.

However, in the dry molding as disclosed in JP-A-5-246465, even when a powdery binding material (starch) is simply mixed with fibers, a molded body to be obtained may be inferior in terms of strength in some cases. Hence, it has been desired to obtain a molded body having a more preferable mechanical strength using a starch and fibers.

SUMMARY

According to an aspect of the present disclosure, there is provided a method for manufacturing a molded body, comprising: a deposition step of depositing a mixture containing fibers and a starch in air; a moisturizing step of applying water to the mixture; and a molding step of forming a molded body by heating and pressurizing the mixture to which the water is applied, and the starch has a value of 2,000 to 10,000, the value being represented by the following expression (I) and being obtained by measurement performed in accordance with the following measurement methods (1) to (4) using a rapid visco analyzer (RVA).

$$5{,}000-30\times T_1-90\times(T_2-T_1)+2\times\eta_1-15\times\eta_2 \quad \text{(I)}$$

In the above expression (I), $T_1$ represents a gelatinization start temperature (° C.), $T_2$ represents a gelatinization peak temperature (° C.), $\eta_1$ represents a gelatinization peak viscosity (mPa·s), and $\eta_2$ represents a trough viscosity (mPa·s).

[Measurement Method]

(1) After a water suspension containing the starch at 25 percent by mass is charged in the RVA as a measurement sample, the temperature thereof is increased to 50° C. and then maintained for one minute.

(2) The temperature of the measurement sample is increased from 50° C. to 93° C. over 4 minutes and then maintained at 93° C. for 7 minutes.

(3) The temperature of the measurement sample is decreased from 93° C. to 50° C. over 4 minutes and then maintained at 50° C. for 3 minutes.

(4) In the above (2) and (3), a rotational speed of a measurement paddle of the RVA is set to 960 rpm for 10 seconds after the start of the viscosity measurement and is then set to 160 rpm 10 seconds thereafter.

DESCRIPTION OF EXEMPLARY EMBODIMENTS

Figure 1:
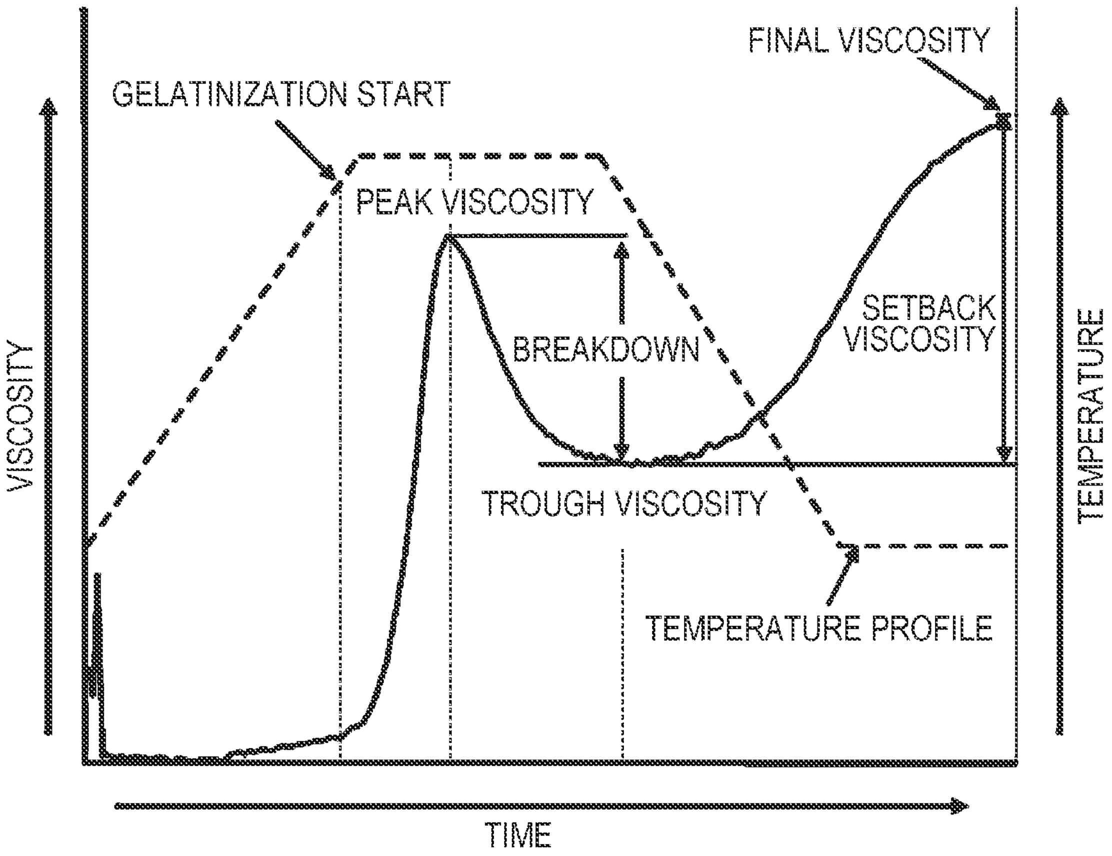
FIG. 1 is a schematic amylogram obtained by a rapid visco analyzer.

Hereinafter, embodiments of the present disclosure will be described. The following embodiments are described to explain examples of the present disclosure. The present disclosure is not limited at all to the following embodiments and also includes various modified embodiments to be performed without departing from the scope of the present disclosure. In addition, the following constituents are not always required to be essential constituents of the present disclosure.

A method for manufacturing a molded body according to this embodiment comprises: a deposition step of depositing a mixture containing fibers and a starch in air; a moisturizing step of applying water to the mixture; and a molding step of forming a molded body by heating and pressurizing the mixture to which the water is applied, and the starch has a value of 2,000 to 10,000, the value being represented by the following expression (I) and being obtained by measurement performed in accordance with the following measurement methods (1) to (4) using a rapid visco analyzer (RVA).

$$5{,}000-30\times T_1-90\times(T_2-T_1)+2\times\eta_1-15\times\eta_2 \quad \text{(I)}$$

In the expression (I), $T_1$ represents a gelatinization start temperature (° C.), $T_2$ represents a gelatinization peak temperature (° C.), $\eta_1$ represents a gelatinization peak viscosity (mPa·s), and $\eta_2$ represents a trough viscosity (mPa·s).

[Measurement Method]

(1) After a water suspension containing the starch at 25 percent by mass is charged in the RVA as a measurement sample, the temperature thereof is increased to 50° C. and then maintained for one minute.

(2) The temperature of the measurement sample is increased from 50° C. to 93° C. over 4 minutes and then maintained at 93° C. for 7 minutes.

(3) The temperature of the measurement sample is decreased from 93° C. to 50° C. over 4 minutes and then maintained at 50° C. for 3 minutes.

(4) In the above (2) and (3), a rotational speed of a measurement paddle of the RVA is set to 960 rpm for 10 seconds after the start of the viscosity measurement and is then set to 160 rpm 10 seconds thereafter.

1. Method for Manufacturing Molded Body

1.1. Molded Body

A molded body formed by the manufacturing method according to this embodiment is not particularly limited as long as being formed to have a predetermined shape. The shape of the molded body is also not particularly limited, and any shape, such as a film, a sheet, a board, or a block, may be formed. The application of the molded body is also not particularly limited. In the manufacturing method of this embodiment, since the deposition step is performed, as the shape of the molded body, a film shape or a sheet shape is more preferable.

1.2. Deposition Step

In the deposition step, a mixture containing fibers and a starch is deposited in air.

1.2.1. Fibers

In the manufacturing method according to this embodiment, various types of fibers may be used. As the fibers, for example, there may be mentioned natural fibers (animal fibers and/or plant fibers) or chemical fibers (organic fibers, inorganic fibers, and/or organic/inorganic complex fibers). In more particular, fibers formed from cellulose, silk, wool, cotton, hemp, kenaf, flax, ramie, jute, manila hemp, sisal hemp, coniferous tree, or broad leaf tree or fibers formed from rayon, lyocell, cupra, vinylon, acryl, nylon, aramid, polyester, polyethylene, polypropylene, polyurethane, polyimide, carbon, glass, or metal may be mentioned, and those fibers mentioned above may be used alone, or at least two types thereof may be appropriately used by mixing. In addition, those fibers mentioned above may also be used as regenerated fibers after being processed by refining or the like. However, among those fibers, natural-derived fibers are more preferably used.

As a raw material of the fibers, for example, waste paper or waste cloth may be mentioned, and at least one type of fibers mentioned above may be contained therein. In addition, the fibers may be processed by various types of surface treatments. In addition, a material of the fiber may be a pure material or may contain a plurality of components, such as impurities, starch particles, and other components.

When the fibers used in this embodiment are assumed as one independent fiber, an average diameter thereof (when the cross-section is not circular, among the lengths in a direction perpendicular to the longitudinal direction, the longest length is regarded as the diameter, or when a circle having the same area as the area of the cross-section described above is assumed, the diameter (equivalent circle diameter) of the circle described above is regarded as the diameter) is 1 to 1,000 μm, preferably 2 to 500 μm, and more preferably 3 to 200 μm.

Although the lengths of the fibers used in this embodiment are not particularly limited, as one independent fiber, a length along the longitudinal direction of the fiber is 1 μm to 5 mm, preferably 2 μm to 3 mm, and more preferably 3 μm to 2 mm. When the length of the fiber is short, the fibers are not likely to be bound to the starch particles, and a sheet strength may be insufficient in some cases; however, when the length of the fiber is in the range described above, a sufficient sheet strength can be obtained.

The thickness and the length of the fiber can be measured by various types of optical microscopes, scanning electron microscopes (SEMs), transmission electron microscopes, fiber testers, and/or the like.

1.2.2. Starch

The starch functions as one component of a molded body to be formed and contributes to retention of the shape thereof, and in addition, the starch is also a component to maintain and improve the characteristics, such as the strength, of the molded body. In the molded body, the starch is able to function as a binding material to bind between the fibers.

The starch is a high molecular weight material in which α-glucose molecules are polymerized by glycosidic bonds. The starch molecule may have a straight structure or may include at least one branched chain.

As the starch, starches derived from various types of plants may be used. As a raw material of the starch, for example, there may be mentioned cereals, such as corn, wheat, or rice; beans, such as broad beans, mung beans, or adzuki beans; tubers and roots, such as potatoes, sweet potatoes, or tapiocas; wild grasses, such as dogtooth violet, bracken, or kudzu; or palms such as sago palm.

In addition, as the starch, a processed starch or a modified starch may also be used. As the processed starch, for example, there may be mentioned an acetylated distarch adipate, an acetylated starch, an oxidised starch, a starch sodium octenyl succinate, a hydroxypropyl starch, a hydroxypropyl distarch phosphate, a monostarch phosphate, a phosphated distarch phosphate, an urea phosphorylated esterified starch, a sodium starch glycolate, or a high-amylose cornstarch. In addition, as the modified starch, for example, there may be mentioned an α-modified starch, a dextrin, a lauryl polyglucose, a cationized starch, a thermoplastic starch, or a starch carbamate.

A starch in the form of powder composed of a plurality of starch particles is preferably mixed with the fibers. Since the starch is supplied in the form of powder, mixing with the fibers can be more efficiently performed. An average particle diameter of the starch particles of the starch powder is preferably 0.5 to 100.0 μm, more preferably 1.0 to 50.0 μm, and further preferably 1.0 to 30.0 μm. Since the particle diameter of the starch particles is in the range described above, the starch particles are likely to be dispersed, and hence, a tensile strength of the molded body to be obtained can be made more excellent. In addition, when the particle diameter is decreased, since the surface area per weight is increased, the starch is likely to absorb water, and as a result, an amount of water to be consumed in the dry molding can be decreased.

The adjustment of the particle diameter of the starch particles can be performed, for example, by pulverization, and a grinding machine, such as a hammer mill, a pin mill, a cutter mill, a pulverizer, a turbo mill, a disc mill, a screen mill, or a jet mill, may be used.

In addition, the starch particles may integrally contain inorganic oxide particles. That is, the starch particles may be a composite in which the starch and the inorganic oxide particles are integrally contained.

Although various types of inorganic oxide particles may be used, inorganic oxide particles to be disposed (for example, to be coated (covered)) on the surfaces of the starch particles are preferably used. As the inorganic oxide particles as described above, fine particles formed from an inorganic material may be mentioned. When the inorganic oxide particles described above are disposed on the surfaces of the starch particles, a significantly excellent aggregation suppressing effect of the starch particles can be obtained.

As a concrete example of the material of the inorganic oxide particles, for example, there may be mentioned silica, titanium oxide, aluminum oxide, zinc oxide, cerium oxide, magnesium oxide, zirconium oxide, strontium titanate, barium titanate, or calcium carbonate.

Although an average particle diameter (number average particle diameter) of the inorganic oxide particles is not particularly limited, the average particle diameter described above is preferably 0.001 to 1 μm and more preferably 0.006 to 0.6 μm. When the particle diameter of primary particles of the inorganic oxide particles is in the range described above, a preferable coating can be performed on the surfaces of the starch particles, and a sufficient aggregation suppressing effect of the starch particles can be obtained. In addition, when the starch particles and the inorganic oxide particles are not integrally contained but are separately contained, at least one inorganic oxide particle is not always present between one starch particle and another starch particle, and hence, compared to the case in which the starch particles and the inorganic oxide particles are integrally contained, the aggregation suppressing effect between the starch particles is believed to be decreased.

When the starch particles integrally contain the inorganic oxide particles, a content of the inorganic oxide particles in the starch particles is preferably 0.1 to 5 parts by mass with respect to 100 parts by mass of the starch. When the above content is in the range as described above, the effect described above can be obtained.

As a method to form the starch particles integrated with the inorganic oxide particles by disposing (coating) the inorganic oxide particles on the surfaces of the starch particles, various methods may be performed, and there may be mentioned a method in which the starch particles and the inorganic oxide particles are simply mixed together so that the inorganic oxide particles are adhered to the surfaces of the starch particles by an electrostatic force or a van der Waals force. However, in the case described above, falling of the inorganic oxide particles from the surfaces of the starch particles is still a concern. Hence, a method in which the starch particles and the inorganic oxide particles are charged in a high rotational mixer and are then uniformly mixed together therein is more preferable. As an apparatus as described above, a known apparatus can be used, and for example, an FM mixer, a Henschel mixer, or a super mixer may be used. By the method as described above, the inorganic oxide particles can be integrally disposed on the surfaces of the starch particles. In addition, the entire surfaces of the starch particles are not always required to be covered with the inorganic oxide particles. In addition, a coverage may be more than 100%, and in accordance with the situation, an appropriate coverage may be selected.

Since the starch particles integrally contain the inorganic oxide particles, the surfaces of the starch particles can be maintained in a state similar to a dry state, and electrical charges can be suppressed from being lost due to moisture. Accordingly, the starch particles are not aggregated in the mixture and are uniformly dispersed therein, and as a result, the strength of the molded body to be obtained can be made more excellent.

A content of the starch with respect to a total mass of the mixture is preferably 2.0 to 70.0 percent by mass, more preferably 3.0 to 65.0 percent by mass, and further preferably 3.5 to 30.0 percent by mass. In addition, the content of the starch can be measured by a component analysis such as an NMR method, and if needed, the measurement can be performed using a pre-treatment method such as enzymatic degradation. The content of the starch in the mixture can be adjusted by a mixing amount in a mixing step which will be described later.

1.2.3. Deposition of Mixture

The mixture can be obtained by mixing at least the fibers and the starch described above. The mixing is preferably performed in air. The "mixing in air" indicates a mixing to be performed using an air flow function. For example, a method (dry method) in which the fibers and the starch are introduced in an air flow so as to be diffused to each other is preferable. In the mixing, the fibers and the starch may be simultaneously mixed together or may be sequentially mixed one by one. The order of the mixing is also not particularly limited.

The mixing may be performed using a known apparatus, such as an FM mixer, a Henschel mixer, or a super mixer. In addition, as the apparatus, there may be mentioned an apparatus which performs stirring by a high rotational blade or an apparatus, such as a V-type mixer, which uses the rotation of a container. Furthermore, a batch type apparatus or a continuous type apparatus may also be used.

1.3. Moisturizing Step

In the moisturizing step, water is applied to the mixture. As the water, tap water, clean water, recycled water, ion exchange water, ultrafiltration water, reverse osmosis water, or distilled water may be used. Among those mentioned above, pure water, such as ion exchange water, ultrafiltration water, reverse osmosis water, or distilled water, or ultrapure water is used, and in particular, when water is sterilized by UV radiation or addition of hydrogen peroxide, the generation of fungi and bacteria can be more preferably suppressed.

Although a method to apply the water to the mixture in the moisturizing step is not particularly limited, for example, spraying, showering, steam moisturizing, or immersion in water may be performed.

An amount of the water applied in the moisturizing step with respect to the total mass of the mixture is preferably 10 to 50 percent by mass and more preferably 12 to 40 percent by mass.

According to this method for manufacturing a molded body, since the amount of the water to be applied is decreased, an excessive wet spreading of the starch particles is suppressed, and the generation of fiber damas (small lumps) in the molded body can be further suppressed.

1.4. Molding Step

In the molding step, since the mixture which is deposited and to which the water is applied is heated and pressurized, the molded body is obtained. Although a method to heat and pressurize is not particularly limited, for example, a pair of heating rollers or a hot press, each of which is able to perform both heating and pressurizing, may be used. In addition, the heating and the pressurizing may be simultaneously or sequentially performed. The mixture thus appropriately moisturized may have a web shape or the like. In addition, a heating portion may have a function to form the mixture into a predetermined shape.

As the method to heat and pressurize, when a pair of heating rollers capable of performing both heating and pressurizing is selected, a pressure roller to pressurize the mixture and a heating roller to heat the mixture are not required to be separately provided, and only by the pair of heating rollers, the heating and the pressurizing of the mixture can be simultaneously performed. Accordingly, for example, the apparatus to be used for this manufacturing can be reduced in size as a whole.

When the mixture is heated and pressurized, the fibers and the starch are bound to each other. The "fibers and the starch are bound to each other" indicates the state in which the fibers and the starch are not likely to be separated from each other or the state in which since the starch is disposed between the fibers, the fibers are not likely to be separated from each other due the starch interposed therebetween. In addition, the "binding" is a concept including adhesion and indicates the state in which at least two types of objects are in contact with each other and are not likely to be separated from each other. In addition, when the fibers are bound to each other with the starch interposed therebetween, the fibers may be disposed in parallel to each other or may be intersected with each other, or a plurality of fibers may also be bound to one fiber.

A heating temperature of the mixture in the molding step is preferably 50° C. to 210° C., more preferably 60° C. to 200° C., even more preferably 70° C. to 180° C., and further preferably 90° C. to 110° C. When the temperature of the mixture in the molding step is in the range described above, even if the viscosity of the starch is not likely to be increased due to a relatively low temperature heating, by the characteristics of the starch, a molded body having an excellent strength and an excellent surface smoothness can be obtained. In addition, since the heating temperature is set to low, the damage done on the fibers by the heating can be reduced.

A pressurizing force in the molding step is preferably 0.1 to 15.0 MPa, more preferably 0.2 to 10.0 MPa, and further preferably 0.3 to 8.0 MPa. Since the pressurizing force is set in the range described above, that is, since the pressurizing is performed at a relatively low pressure, the damage done on the fibers can be reduced, and the strength of the molded body to be obtained can be made more excellent.

1.5. Other Steps

The method for manufacturing a molded body of this embodiment may further include other steps other than those described above. As the other steps described above, for example, there may be mentioned a preparation step, such as a step to obtain the fibers by defibrating a raw material and/or a step to classify the fibers and the starch, and/or a processing step to perform cutting, machining, or the like of the molded body which is heated and pressurized.

1.6. Characteristics of Starch

The starch used in the method for manufacturing a molded body of this embodiment has a value of 2,000 to 10,000, the value being represented by the following expression (I) and obtained by measurement performed in accordance with the following measurement methods (1) to (4) using a rapid visco analyzer (RVA).

$$5{,}000-30\times T_1-90\times(T_2-T_1)+2\times\eta_1-15\times\eta_2 \quad \text{(I)}$$

In the above expression (I), $T_1$ represents a gelatinization start temperature (° C.), $T_2$ represents a gelatinization peak temperature (° C.), $\eta_1$ represents a gelatinization peak viscosity (mPa·s), and $\eta_2$ represents a trough viscosity (mPa·s).

[Measurement Method]

(1) After a water suspension containing the starch at 25 percent by mass is charged in the RVA as a measurement sample, the temperature thereof is increased to 50° C. and then maintained for one minute.

(2) The temperature of the measurement sample is increased from 50° C. to 93° C. over 4 minutes and then maintained at 93° C. for 7 minutes.

(3) The temperature of the measurement sample is decreased from 93° C. to 50° C. over 4 minutes and then maintained at 50° C. for 3 minutes.

(4) In the above (2) and (3), a rotational speed of a measurement paddle of the RVA is set to 960 rpm for 10 seconds after the start of the viscosity measurement and is then set to 160 rpm 10 seconds thereafter.

1.6.1. Rapid Visco Analyzer

A rapid visco analyzer (RVA) is an apparatus to measure viscosity characteristics of starch, cereal, wheat, and the like and is a rotational viscometer capable of setting a temperature control and rotation conditions. An RVA is available, for example, from Newport Scientific, PerkinElmer, or NSP Ltd. The rapid visco analyzer is able to perform measurement using a small amount of a sample (such as approximately 3 g), and a measurement time is, for example, approximately 20 minutes. In addition, the number of rotations of a rotational paddle (stirrer) and a temperature gradient can be arbitrarily set, and the gelatinization characteristics of the sample can be recorded as a viscosity curve.

1.6.2. Viscosity Curve of Rapid Visco Analyzer

FIG. 1 shows a typical example of a viscosity curve (amylogram) obtained by measurement of a mixture containing a starch and water using a rapid visco analyzer. With reference to FIG. 1, viscosities, temperatures, and the like will be described. When the measurement is started, the stirrer is rotated, and the temperature of the system is increased. As the temperature is increased, the viscosity is gradually increased, and the gelatinization of the starch is started. The temperature at this point is regarded as a gelatinization start temperature ($T_1$). After the gelatinization is started, the temperature increase is stopped for a predetermined time, and while the stirring is continued, the viscosity is measured. As a result, a peak appears in the viscosity curve. The viscosity at this peak is defined as a gelatinization peak viscosity ($\eta_1$), and the temperature at this peak is defined as a gelatinization peak temperature ($T_2$).

When the stirring is continuously performed after the peak viscosity appears, the viscosity of the system is decreased. A viscosity measured after the viscosity is decreased is defined as a trough viscosity ($\eta_2$). Subsequently, the temperature of the system is decreased to a predetermined temperature. A viscosity at the predetermined temperature is defined as a final viscosity. In addition, the difference between the final viscosity and the trough viscosity is defined as a setback viscosity.

The amylogram includes various information on the starch, such as behavior of crystals, behavior of gelatinization, interaction with water molecules, swelling behavior of particles, inherent characteristics and origin, moisture retention capacity, high order structure, and aging.

In this embodiment, (1) after a water suspension containing a starch at a concentration of 25 percent by mass is charged in an RVA as a measurement sample, a temperature thereof is increased to 50° C. and then maintained for one minute. (2) The temperature of the measurement sample is increased from 50° C. to 93° C. over 4 minutes and then maintained at 93° C. for 7 minutes. (3) The temperature of the measurement sample is decreased from 93° C. to 50° C. over 4 minutes and then maintained at 50° C. for 3 minutes. (4) In the above (2) and (3), a rotational speed of a measurement paddle of the RVA is set to 960 rpm for 10 seconds after the start of the viscosity measurement and then set to 160 rpm 10 seconds thereafter.

1.7. Value Represented by Expression (I)

In the manufacturing method of this embodiment, a starch having a value of 2,000 to 10,000 is used, the value being represented by the following expression (I).

$$5{,}000-30\times T_1-90\times(T_2-T_1)+2\times\eta_1-15\times\eta_2 \quad \text{(I)}$$

In the above expression (I), $T_1$ represents a gelatinization start temperature (° C.), $T_2$ represents a gelatinization peak temperature (° C.), $\eta_1$ represents a gelatinization peak viscosity (mPa·s), and $\eta_2$ represents a trough viscosity (mPa·s).

Accordingly, a well-balanced total contribution of the water absorption characteristics, the gelatinization characteristics, and the viscosity characteristics can be obtained, and as a result, a molded body having a more excellent mechanical strength can be obtained.

A knowledge in that when the constant value and the coefficients shown in the expression (I) are set to (5,000) and (−30, −90, +2, and −15), respectively, and when the value obtained from the expression (I) is 2,000 to 10,000, the effect as described above can be obtained is empirically obtained through intensive experiments carried out by the present inventors. Hence, although a detailed mechanism to obtain the effect as described above has not been clearly understood, the behavior of the starch in the molding step in which the heating and the pressurizing are performed is believed to primarily relate to the effect described above.

The second term ($-30\times T_1$) of the expression (I) indicates that a lower gelatinization start temperature is advantageous in terms of improvement in paper strength, and it is believed that when the gelatinization start temperature is low, a gelatinization efficiency of the starch functioning as a binding material is increased, and as a result, the paper strength is improved. In addition, the third term ($-90\times(T_2-T_1)$) of the expression (I) indicates that when the difference in temperature from the gelatinization start to the peak is small, that is, when a temperature gradient is steep, the paper strength is increased. This temperature gradient relates to a water absorption rate of the starch, and a steeper temperature gradient indicates a higher water absorption rate. It is believed that the paper strength is improved by a higher water absorption rate.

The fourth term ($+2\times\eta_1$) of the expression (I) indicates that a high gelatinization peak viscosity contributes to an improvement in paper strength. The gelatinization peak viscosity relates to a water absorption ability of a raw starch in the gelatinization, and it is believed that since the starch absorbs a larger amount of moisture, a gelatinization reaction is advance by heating, a binding force of the starch is increased thereby, and as a result, the paper strength is improved. In addition, the fifth term ($-15\times\eta_2$) of the expression (I) indicates that a starch having a low trough viscosity is advantageous in terms of improvement in paper strength. It is believed that when the trough viscosity is low, since the starch functioning as a binding material is more widely wet-spread on fiber surfaces when being heated and pressurized, an adhesion area is further increased, and as a result, the paper strength is increased.

The gelatinization characteristic values are changed, for example, by the amylose/amylopectin ratio, the molecular structure, the molecular weight, the branching degree, and the degree of acid treatment reaction of each raw starch.

The paper strength is finally obtained as the result of the balance of all the characteristics, that is, the water absorption characteristics, the gelatinization characteristics, and the viscosity characteristics, and the total characteristics thereof are required to be defined by an expression. When a calculated value of the expression is excessively low, the water absorption characteristics, the gelatinization characteristics, and the viscosity characteristics are insufficient, and by the reason described above, the paper strength cannot be secured. When the calculated value of the expression is excessively high, the water absorption characteristics and/or the gelatinization characteristics are excessively high, and hence, when the water absorption characteristics are excessively high, drying cannot be sufficiently performed, and when the gelatinization characteristics are excessively high, the adhesion area is made insufficient, so that the paper strength is degraded in both cases.

The value obtained from the expression (I) is more preferably 2,100 to 9,300 and further preferably 2,500 to 8,000. When a starch having the value as described above is used, a molded body having a more excellent mechanical strength can be obtained.

2. Experimental Examples

Hereinafter, with reference to experimental examples, although the present disclosure will be further described, the present disclosure is not at all limited to the following examples.

2.1. Manufacturing of Raw Starch

After 4.5 kg of a potato starch was charged in a paddle dryer (volume: 10 L, manufactured by Nara Machinery Co., Ltd.), 200 g of a 5N-hydrochloric acid aqueous solution was sprayed thereon with stirring, and a mixture thus obtained was uniformly mixed and stirred. Subsequently, the mixture was heated to 70° C. for pre-drying to have a water content of 7.5%. Next, a heat treatment was performed at a heating temperature of 120° C., and a reaction time was adjusted, so that seven types of raw starches (starch 2, starch 3, starch 4, starch 5, starch 6, starch 7, and starch 8) having different hydrolysis times were obtained. The viscosities of the starches (final viscosities of the amylograms) were measured, and viscosities of 149 mPa·s (starch 2), 143 mPa·s (starch 3), 140 mPa·s (starch 4), 112 mPa·s (starch 5), 86 mPa·s (starch 6), 74 mPa·s (starch 7), and 58 mPa·s (starch 8) were obtained. The final viscosity of the amylogram of the raw starch was 151 mPa·s (starch 1).

Since a treatment similar to that described above was performed except for that a waxy cornstarch was used instead of using the potato starch, starch 9 (starch viscosity: 260 mPa·s), starch 10 (starch viscosity: 223 mPa·s), starch 11 (starch viscosity: 178 mPa·s), starch 12 (starch viscosity: 137 mPa·s), and starch 13 (starch viscosity: 91 mPa·s) were obtained, and since a treatment similar to that described above was performed except for that a tapioca starch was used instead of using the potato starch, starch 14 (starch viscosity: 124 mPa·s), starch 15 (starch viscosity: 96 mPa·s), starch 16 (starch viscosity: 64 mPa·s), starch 17 (starch viscosity: 51 mPa·s), and starch 18 (starch viscosity: 45 mPa·s) were obtained.

2.2. Measurement of Gelatinization Characteristics of Starch

The amylogram was measured under the following conditions using an RVA4800 manufactured by NSP Ltd. The gelatinization start temperature (° C.), the gelatinization peak temperature (° C.), the gelatinization peak viscosity (mPa·s), the trough viscosity (mPa·s), the final viscosity (mPa·s), and the setback viscosity (mPa·s) read from the amylogram of each of the starches 1 to 18 are shown in the table. In addition, the calculated value of the expression (I) of each of the starches 1 to 18 is shown in the table. In addition, the results of the starches 1 to 18 are shown in the columns of manufacturing examples 1 to 18, respectively.

Sample concentration: water suspension at 25 percent by mass

Number of paddle rotations: 960 rpm for 10 seconds from start of viscosity measurement, and 160 rpm 10 seconds thereafter Temperature Profile Setting Temperature is maintained at 50° C. for one minute.

Temperature is increased to 93° C. over 4 minutes.

Temperature is maintained at 93° C. for 7 minutes.

Temperature is decreased to 50° C. over 4 minutes.

Temperature is maintained at 50° C. for 3 minutes.

Figure 2:
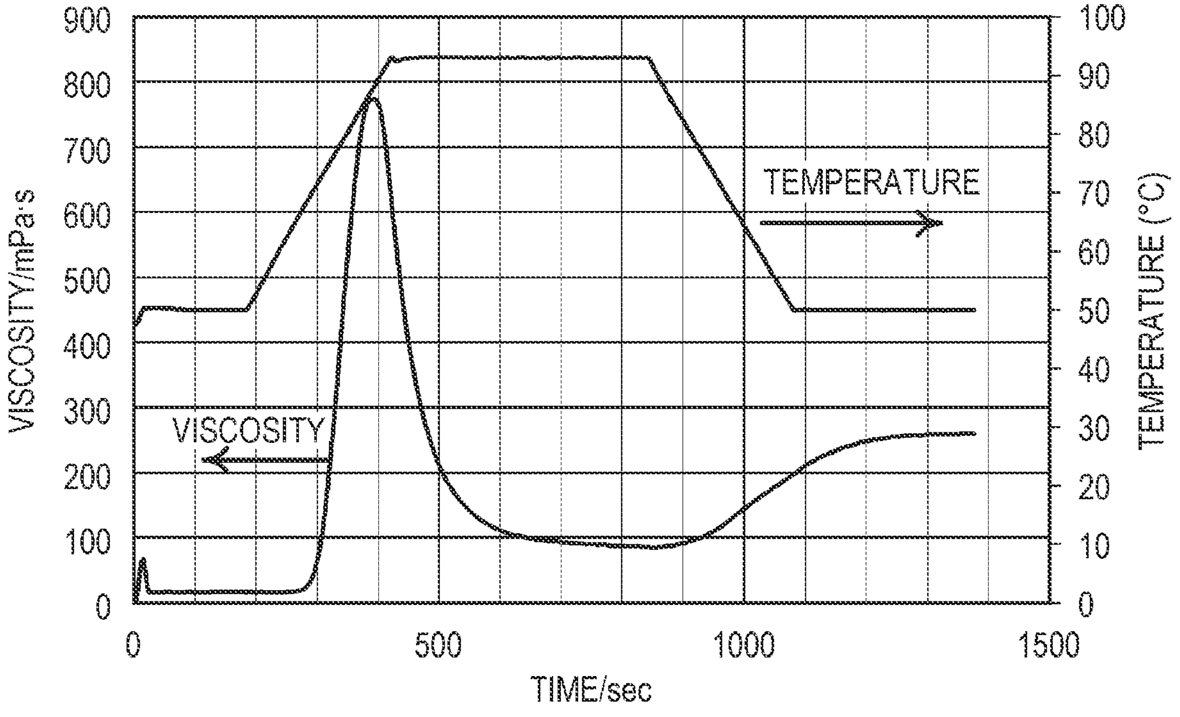
FIG. 2 is an example of an amylogram according to a manufacturing example.

As one example, the amylogram of the starch 6 is shown in FIG. 2.

2.3. Manufacturing of Starch Integrally Containing Inorganic Oxide Particles (1) Pulverization of Raw Starch The starches formed as described above were used as raw materials and were pulverized by a fluidized bed opposed jet mill (counter jet mill AFG-R, manufactured by Hosokawa Micron Corporation). Starch particles (in the form of powder) having an average particle diameter of 5 μm were obtained at a compressed air pressure of 6 bar.

(2) Integration of Inorganic Oxide Particles

The starch particles and a fumed silica (HM-30S, manufactured by Tokuyama Corporation) were charged in a Henschel mixer (FM mixer, manufactured by Nippon Coke and Engineering Company Limited), and a mixing treatment was performed at a frequency of 60 Hz for 10 minutes. A mixing ratio of the starch particles to the fumed silica was set to 100:2 on a mass basis. Subsequently, a sieving treatment was performed by a sieve having an opening of 30 μm, so that a starch integrally containing the inorganic oxide particles was obtained.

(3) Manufacturing of Molded Body

A molded body of each manufacturing example was formed to have a sheet shape. In a modified Paper Labo A-8000 manufactured by Seiko Epson Corporation (dry sheet manufacturing apparatus) modified so as to moisturize a sheet after being formed and before being pressurized, a cartridge filled with the starch of each example was loaded. In addition, in manufacturing examples 1 to 18, the starches 1 to 18 were used, respectively. In a sheet feeder, used paper in which a business document was printed on recycled copy paper (GR-70W: manufactured by Fuji Xerox) by an ink jet printer was loaded, and a regenerated sheet was manufactured at a starch concentration of 6 percent by mass and a basis weight of 80 g/m$^2$.

(4) Evaluation Method of Sheet Tensile Strength

From a regenerated sheet immediately after being manufactured, a rectangular shape having a size of 100 mm×20 mm was obtained by cutting, and a rupture strength thereof in a longitudinal direction was measured. As a measurement apparatus, an Autograph AGS-iN manufactured by Shimadzu Corporation was used, and after the rupture strength was measured at a tensile rate of 20 mm/sec, a specific tensile strength was calculated therefrom. From the specific tensile strength thus calculated, the rupture strength was evaluated in accordance with the following criteria, and the results are shown in the table.

A: 40 Nm/g or more
B: 30 Nm/g to less than 40 Nm/g
C: 20 Nm/g to less than 30 Nm/g
D: 10 Nm/g to less than 20 Nm/g
E: less than 10 Nm/g

TABLE 1

| | MANUFACTURING EXAMPLE 1 | MANUFACTURING EXAMPLE 2 | MANUFACTURING EXAMPLE 3 | MANUFACTURING EXAMPLE 4 | MANUFACTURING EXAMPLE 5 |
|---|---|---|---|---|---|
| GELATINIZATION START TEMPERATURE (° C.) | 62.4 | 61.9 | 61.7 | 61.3 | 59.8 |
| GELATINIZATION PEAK TEMPERATURE (° C.) | 73.5 | 73.0 | 72.9 | 72.8 | 72.0 |
| GELATINIZATION PEAK VISCOSITY (mPa · s) | 5112 | 3900 | 2800 | 1552 | 1410 |
| TROUGH VISCOSITY (mPa · s) | 45 | 45 | 45 | 44 | 41 |
| FINAL VISCOSITY (mPa · s) | 151 | 149 | 143 | 140 | 112 |
| SETBACK VISCOSITY (mPa · s) | 106 | 102 | 99 | 96 | 61 |
| CALCULATED VALUE OF EXPRESSION (I) | 11678 | 9269 | 7066 | 4567 | 4313 |
| EVALUATION OF TENSILE STRENGTH | D | C | C | A | A |

| | MANUFACTURING EXAMPLE 6 | MANUFACTURING EXAMPLE 7 | MANUFACTURING EXAMPLE 8 | MANUFACTURING EXAMPLE 9 |
|---|---|---|---|---|
| GELATINIZATION START TEMPERATURE (° C.) | 57.5 | 53.5 | 50.1 | 67.9 |
| GELATINIZATION PEAK TEMPERATURE (° C.) | 71.4 | 70.9 | 70.7 | 87.8 |
| GELATINIZATION PEAK VISCOSITY (mPa · s) | 1258 | 821 | 436 | 774 |
| TROUGH VISCOSITY (mPa · s) | 39 | 32 | 25 | 85 |
| FINAL VISCOSITY (mPa · s) | 86 | 74 | 58 | 260 |
| SETBACK VISCOSITY (mPa · s) | 47 | 42 | 33 | 175 |
| CALCULATED VALUE OF EXPRESSION (I) | 3952 | 2991 | 2145 | 1450 |
| EVALUATION OF TENSILE STRENGTH | B | C | C | D |

| | MANUFACTURING EXAMPLE 10 | MANUFACTURING EXAMPLE 11 | MANUFACTURING EXAMPLE 12 | MANUFACTURING EXAMPLE 13 | MANUFACTURING EXAMPLE 14 |
|---|---|---|---|---|---|
| GELATINIZATION START TEMPERATURE (° C.) | 65.5 | 63.2 | 61.8 | 59.4 | 71.2 |
| GELATINIZATION PEAK TEMPERATURE (° C.) | 86.9 | 86.1 | 85.4 | 84.7 | 74.9 |
| GELATINIZATION PEAK VISCOSITY (mPa · s) | 612 | 502 | 365 | 215 | 98 |

TABLE 1-continued

| | | | | | |
|---|---|---|---|---|---|
| TROUGH VISCOSITY (mPa · s) | 75 | 64 | 51 | 40 | 41 |
| FINAL VISCOSITY (mPa · s) | 223 | 178 | 137 | 91 | 124 |
| SETBACK VISCOSITY (mPa · s) | 148 | 114 | 86 | 51 | 83 |
| CALCULATED VALUE OF EXPRESSION (I) | 1208 | 1087 | 987 | 771 | 2112 |
| EVALUATION OF TENSILE STRENGTH | D | D | E | E | C |

| | MANUFACTURING EXAMPLE 15 | MANUFACTURING EXAMPLE 16 | MANUFACTURING EXAMPLE 17 | MANUFACTURING EXAMPLE 18 |
|---|---|---|---|---|
| GELATINIZATION START TEMPERATURE (° C.) | 67.8 | 64.9 | 62.3 | 59.8 |
| GELATINIZATION PEAK TEMPERATURE (° C.) | 73.8 | 73.6 | 72.1 | 71.2 |
| GELATINIZATION PEAK VISCOSITY (mPa · s) | 81 | 67 | 61 | 52 |
| TROUGH VISCOSITY (mPa · s) | 38 | 35 | 27 | 21 |
| FINAL VISCOSITY (mPa · s) | 96 | 64 | 51 | 45 |
| SETBACK VISCOSITY (mPa · s) | 58 | 29 | 24 | 24 |
| CALCULATED VALUE OF EXPRESSION (I) | 2018 | 1884 | 1966 | 1969 |
| EVALUATION OF TENSILE STRENGTH | C | D | D | D |

2.4. Evaluation Results

It was found that the sheets of manufacturing examples 2 to 8 and 14 to 15 in each of which the value represented by the expression (I) was 2,000 to 10,000 had a preferable mechanical strength.

The embodiments described above are each only one example, and the present disclosure is not limited thereto. For example, the embodiments and the modified examples may also be appropriately used in combination.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions can be obtained.

A method for manufacturing a molded body, comprises: a deposition step of depositing a mixture containing fibers and a starch in air; a moisturizing step of applying water to the mixture; and a molding step of forming a molded body by heating and pressurizing the mixture to which the water is applied, and the starch has a value of 2,000 to 10,000, the value being represented by the following expression (I) and being obtained by measurement performed in accordance with the following measurement methods (1) to (4) using a rapid visco analyzer (RVA).

$$5{,}000-30\times T_1-90\times(T_2-T_1)+2\times\eta_1-15\times\eta_2 \quad \text{(I)}$$

In the expression (I), $T_1$ represents a gelatinization start temperature (° C.), $T_2$ represents a gelatinization peak temperature (° C.), $\eta_1$ represents a gelatinization peak viscosity (mPa·s), and $\eta_2$ represents a trough viscosity (mPa·s).

[Measurement Method]

(1) After a water suspension containing the starch at 25 percent by mass is charged in the RVA as a measurement sample, the temperature thereof is increased to 50° C. and then maintained for one minute.

(2) The temperature of the measurement sample is increased from 50° C. to 93° C. over 4 minutes and then maintained at 93° C. for 7 minutes.

(3) The temperature of the measurement sample is decreased from 93° C. to 50° C. over 4 minutes and then maintained at 50° C. for 3 minutes.

(4) In the above (2) and (3), a rotational speed of a measurement paddle of the RVA is set to 960 rpm for 10 seconds after the start of the viscosity measurement and is then set to 160 rpm 10 seconds thereafter.

According to this method for manufacturing a molded body, the value obtained by the expression (I) is controlled at 2,000 to 10,000, and a dry molded body excellent in strength can be obtained. That is, the strength of the molded body manufactured according to this manufacturing method is obtained by a well-balanced total contribution of the water absorption characteristics, the gelatinization characteristics, and the viscosity characteristics of the starch. In addition, in the expression (I), as the value of $T_1$ is lower, since a timing at which the starch is gelatinized and at which a binding force is obtained is advanced, the strength of the molded body is made excellent. In addition, in the expression (I), since the value of $(T_2-T_1)$ is believed to relate to a water absorption rate of the starch, and since the starch rapidly absorbs water as this value is smaller, the gelatinization is likely to occur by a small amount of moisture even in the dry molding, and the strength of the molded body can be made excellent. In addition, in the expression (I), as the value of $\eta_1$ is higher, since the starch becomes sticky when being gelatinized, a molded body excellent in strength can be manufactured. Furthermore, in the expression (I), as the value of $\eta_2$ is lower, since the starch is likely to be wet-spread by heating and pressurizing, a molded body excellent in strength can be manufactured.

In the method for manufacturing a molded body described above, a heating temperature of the mixture described above in the molding step may be 60° C. to 200° C.

According to this method for manufacturing a molded body, even in the case in which the viscosity of the starch is not likely to be increased due to heating at a relatively low temperature, because of the characteristics of the starch, a molded body having an excellent strength and an excellent surface smoothness can be obtained. In addition, since the heating temperature is set to low, the damage on the fibers caused by the heating can be reduced.

In the method for manufacturing a molded body described above, the molding step may be performed by a pair of heating rollers.

According to this method for manufacturing a molded body, a pressure roller to pressurize the mixture and a heating roller to heat the mixture are not required to be separately provided, and only by a pair of heating rollers, the heating and the pressurizing of the mixture can be simultaneously performed. Hence, an apparatus used for the manufacturing can be reduced in size as a whole.

In the method for manufacturing a molded body described above, a pressurizing force in the molding step may be 0.2 to 10.0 MPa.

According to this method for manufacturing a molded body, since the pressurizing is performed at a relatively low pressure, the damage on the fibers can be reduced, and the strength of the molded body thus obtained can be made more excellent.

In the method for manufacturing a molded body described above, an amount of the water applied in the moisturizing step with respect to a total mass of the mixture may be 12 to 40 percent by mass.

According to this method for manufacturing a molded body, since the amount of the water to be applied is decreased, an excessive wet spreading of the starch particles can be suppressed, and the generation of fiber damas in the molded body can be further suppressed. In addition, energy required for the molding can be reduced.

In the method for manufacturing a molded body described above, the starch is in the form of powder composed of a plurality of starch particles, and an average particle diameter of the starch particles may be 1.0 to 30.0 μm.

According to this method for manufacturing a molded body, since the average particle diameter of the starch particles is in the range described above, the starch is likely to be dispersed, and hence, the tensile strength of the molded body thus obtained is made excellent. In addition, since a surface area per weight of the starch is increased due to the decrease in particle diameter thereof, the starch is likely to absorb water, and an amount of water consumed in the dry molding can be reduced.

In the method for manufacturing a molded body described above, the starch particles may integrally contain inorganic oxide particles.

According to this method for manufacturing a molded body, since the starch particles integrally contain the inorganic oxide particles, the surfaces of the starch particles can be maintained in a state similar to a dry state, and hence, electrical charges are suppressed from being lost due to moisture. Accordingly, the starch particles are uniformly dispersed in the mixture without being aggregated, and as a result, the strength of the molded body thus obtained can be made more excellent.

What is claimed is:

1. A method for manufacturing a molded body, comprising: a deposition step of depositing a mixture containing fibers and a starch in air; a moisturizing step of applying water to the mixture; and a molding step of forming a molded body by heating and pressurizing the mixture to which the water is applied, wherein the starch has a value of 2,000 to 10,000, the value being represented by the following expression (I) and being obtained by measurement performed in accordance with the following measurement methods (1) to (4) using a rapid visco analyzer (RVA):

$$(I)=(5{,}000)-(30\times T_1)-(90\times(T_2-T_1)+(2\times\eta_1)-(15\times\eta_2)$$

where in the expression (I), T1 represents a gelatinization start temperature (° C.), T2 represents a gelatinization peak temperature (° C.), η1 represents a gelatinization peak viscosity (mPa·s), and $n_2$ represents a trough viscosity (mPa·s), and wherein the measurement is performed such that (1) after a water suspension containing the starch at 25 percent by mass is charged in the RVA as a measurement sample, the temperature thereof is increased to 50° C. and then maintained for one minute; (2) the temperature of the measurement sample is increased from 50° C. to 93° C. over 4 minutes and then maintained at 93° C. for 7 minutes; (3) the temperature of the measurement sample is decreased from 93° C. to 50° C. over 4 minutes and then maintained at 50° C. for 3 minutes; and (4) in the above (2) and (3), a rotational speed of a measurement paddle of the RVA is set to 960 rpm for 10 seconds after the start of the viscosity measurement and is then set to 160 rpm 10 seconds thereafter.

2. The method for manufacturing a molded body according to claim 1, wherein a heating temperature of the mixture in the molding step is 60° C. to 200° C.

3. The method for manufacturing a molded body according to claim 1, wherein the molding step is performed by a pair of heating rollers.

4. The method for manufacturing a molded body according to claim 1, wherein a pressurizing force in the molding step is 0.2 to 10.0 MPa.

5. The method for manufacturing a molded body according to claim 1, wherein an amount of the water applied in the moisturizing step with respect to a total mass of the mixture is 12 to 40 percent by mass.

6. The method for manufacturing a molded body according to claim 1, wherein the starch is in the form of powder composed of a plurality of starch particles, and an average particle diameter of the starch particles is 1.0 to 30.0 μm.

7. The method for manufacturing a molded body according to claim 6, wherein the starch particles integrally contain inorganic oxide particles.

* * * * *